(12) United States Patent
Adams

(10) Patent No.: US 7,899,811 B2
(45) Date of Patent: Mar. 1, 2011

(54) BOOSTING THROUGHPUT OF A COMPUTER FILE SERVER

(75) Inventor: Stephen L. Adams, Oakdale, CA (US)

(73) Assignee: Stephen L. Adams, Oakdale, CA (US)

(*) Notice: Subject to any disclaimer, the term of this patent is extended or adjusted under 35 U.S.C. 154(b) by 484 days.

(21) Appl. No.: 11/998,160

(22) Filed: Nov. 27, 2007

(65) Prior Publication Data

US 2008/0301353 A1 Dec. 4, 2008

Related U.S. Application Data

(60) Provisional application No. 60/872,212, filed on Dec. 1, 2006.

(51) Int. Cl.
*G06F 17/30* (2006.01)
*G06F 13/14* (2006.01)

(52) U.S. Cl. ............ 707/716; 707/765; 710/53; 711/100

(58) Field of Classification Search ........................ None
See application file for complete search history.

(56) References Cited

U.S. PATENT DOCUMENTS

| | | | |
|---|---|---|---|
| 5,218,695 A | 6/1993 | Noveck et al. | |
| 5,845,280 A | 12/1998 | Treadwell, III et al. | |
| 5,913,028 A | 6/1999 | Wang et al. | |
| 6,687,764 B2* | 2/2004 | Sonoda et al. | 710/6 |
| 7,058,014 B2 | 6/2006 | Sim | |
| 7,080,131 B2* | 7/2006 | Palevich et al. | 709/217 |
| 2004/0215746 A1 | 10/2004 | McCanne et al. | |
| 2006/0069719 A1 | 3/2006 | McCanne et al. | |

OTHER PUBLICATIONS

P.J. Connolly, "Windows Media Services 9 raises bar for Apple Real Media", May 2, 2003, (pp. 1-3), http://www.infoworld.com/article/03/05/02/18TCwms9_1.html?s=tc.
"Microsoft Media Services", Sep. 22, 2006, (p. 1), http://en.wikipedia.org/wiki/Microsoft_Media_Services.
"Unicast", Jul. 27, 2006, (p. 1), http://en.wikipedia.org/wiki/Unicast.

* cited by examiner

*Primary Examiner* — Gary J Portka

(57) ABSTRACT

A software layer for boosting the throughput of a computer file server by reducing the number of required mechanical accesses to the physical storage is provided. The throughput boost is achieved through the combination of extending the data requests along the file path and inserting double-buffered paths in front of each file accessed. The software layer resides on top of the file system, where it can extend requests along the file path, work with network requests arriving over any network using any protocol, and work with any storage system attached to the server. The software layer can also be used in a server to accelerate requests made by local applications in the server or it may be used in any other computer to accelerate requests made by local applications that require data from local storage.

8 Claims, 4 Drawing Sheets

BOOSTING THROUGHPUT OF A COMPUTER FILE SERVER

CROSS-REFERENCE TO RELATED APPLICATIONS

This application claims priority from U.S. Provisional Patent Application 60/872,212 filed Dec. 1, 2006, which is incorporated herein by reference.

FIELD OF THE INVENTION

The present invention relates generally to computer file servers. More particularly, the present invention relates to methods and systems for increasing generic file server performance.

BACKGROUND

File servers on a computer network today typically receive small, random requests. This is true whether the server is a low-cost Network Attached Server (NAS) box or a million-dollar high-end server. Small requests are enforced by the computer network protocols, which break larger client requests into smaller subrequests to more equitably share the network bandwidth. CIFS, the common network protocol for Windows machines, currently breaks client requests into 60 KByte subrequests while NFS, the common network protocol for Unix-derived machines, breaks client requests into 32 KByte subrequests. Thus, a request issued by a Windows client for 1 MByte of a file comes to the server as 17 subrequests of 60 KBytes followed by one subrequest for 4 KBytes. The subrequests arriving at the file server are random because they are generated from requests issued by multiple client processes for totally unrelated files. The server, therefore, receives a stream of short and random requests—the worst possible load for a server since each small random request tends to generate a mechanical access.

Servers today try to get around small network requests by having disk controllers read ahead data. Physical disks themselves even read ahead a track of data into local buffers. But today's disk and disk controller solutions fall far short of what is possible because:
1. They must read ahead physically on the disk since they have no knowledge of how the file is laid out on the disk. This physical read ahead may return irrelevant data instead of the next file data.
2. Disk controllers lack the intelligence and information to concurrently track the progress of hundreds of client processes requesting server files, so even when the physical read ahead does return relevant data, the buffers receiving the data are likely to be overwritten with new data before the current data is requested by a client.

As an example of the state of the art today, a Dell PowerEdge 2850 server has a sophisticated storage system that includes five 15K Ultra 320 SCSI drives with track buffering and command queuing, configured into a RAID-5 array by an PERC4e/Di controller with 256 MBytes of buffering. The challenge in the art is to develop methods and systems to increase data throughput of server's like the Dell PowerEdge 2850.

The present invention addresses the difficult problem of boosting throughput of a computer file server and advances the art with a method using double-buffered paths and read aheads done at the file level.

SUMMARY OF THE INVENTION

The present invention is referred to as "DataFlood" and is a method for increasing the throughput of a computer file server. DataFlood is implemented by a layer of software in the server's operating system. The DataFlood layer receives the short subrequests from network clients over a standard computer network and significantly extends the length of one or more of the subrequests along the file path to approximate the original larger client request before sending it to the file system. Additionally, a pair of large buffers dynamically assigned from a buffer pool establishes a double-buffered path between the storage system and each file being requested from the server. The combination of subrequest extensions and a double-buffered path, performed concurrently and managed by the intelligence in the DataFlood layer software, which is located strategically between the network and the server file system, boosts the throughput of the file server. The boost occurs because the server saturates at the rate that the large DataFlood buffers can be filled from storage rather than at the rate that the random short requests coming over the network can be filled from storage and then returned to the client process. In one embodiment, throughput of a Dell PowerEdge 2850 server was increased six fold by DataFlood while the server was processing requests for 50 different files from remote client processes.

BRIEF DESCRIPTION OF THE FIGURES

The present invention together with its objectives and advantages will be understood by reading the following description in conjunction with the drawings, in which.

DETAILED DESCRIPTION OF THE INVENTION

A server generally receives a stream of random subrequests for data from clients over a network. The task of the server is to fetch the data from its storage and return it to the clients. A large amount of time is expended to complete this task due to the small size and shuffled nature of the subrequests, which require numerous mechanical disk accesses to different regions of the physical storage to retrieve, without returning much of the original client request. Server performance would significantly improve if the number of mechanical disk accesses needed to retrieve data requested by clients could be reduced. The present invention, referred to as DataFlood, boosts the server performance in this manner. DataFlood effectively unshuffles the small subrequests received over the network to reconstruct an approximation of the larger original client requests, thereby reducing the number of mechanical disk accesses.

For example, a process in a remote Windows client may be issuing 1 MByte requests to read a 1 GByte remote file sequentially from a server and each 1 MByte request gets chopped by the network protocols into 17 60 KByte subrequests and one 4 KByte subrequest. DataFlood effectively finds the 18 subrequests for this particular process in the mixture consisting of all the subrequests arriving from all of the remote clients, puts the subrequests back together into the original 1 MByte client request, and sends the larger recombined request to the storage.

Figure 1:
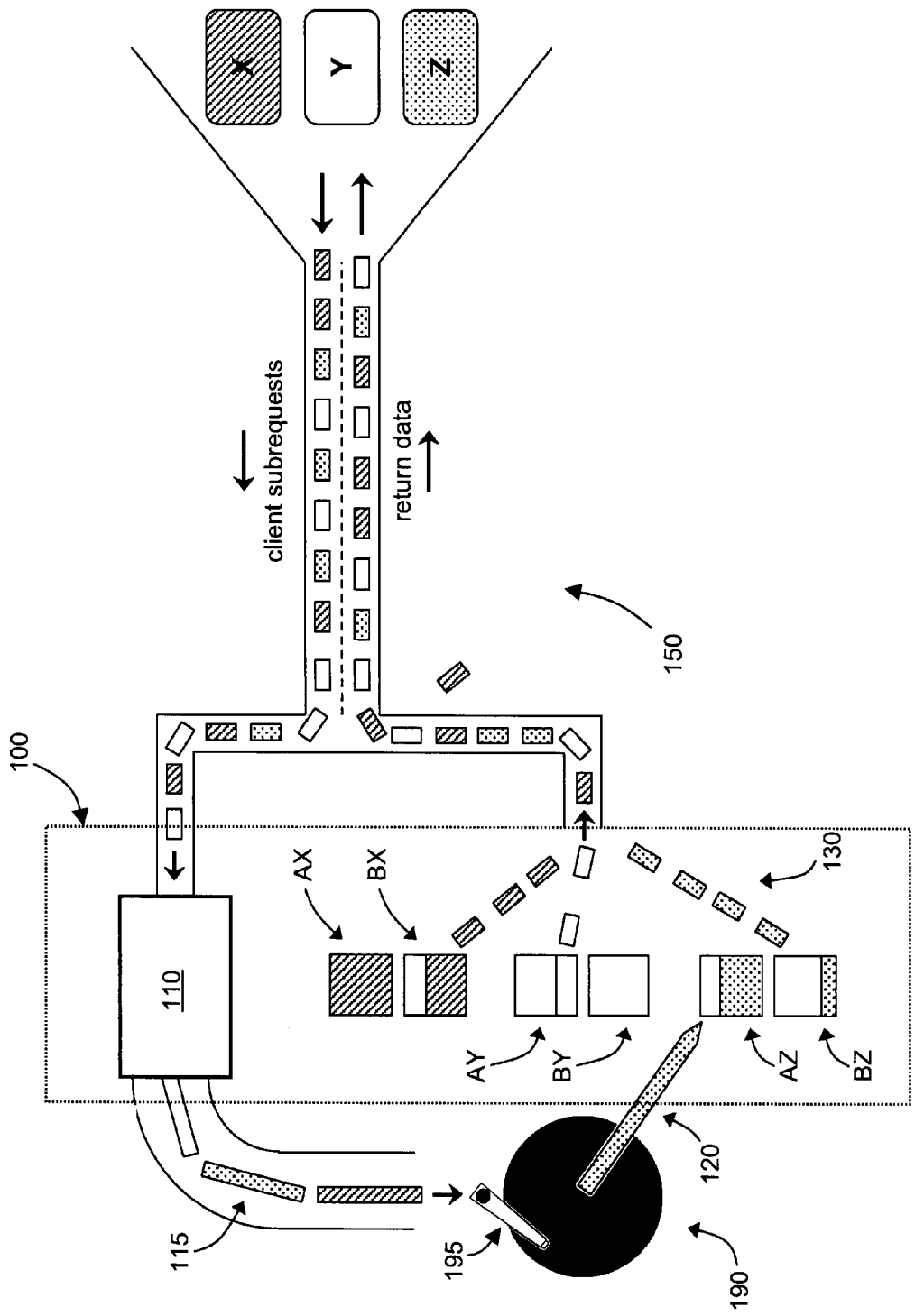
FIG. 1 shows an example of boosting a file server's throughput by using the combination of file read aheads and double-buffered paths according to the present invention.

FIG. 1 shows an example of unshuffling, or recombining, the subrequests. Client processes X, Y, and Z issue requests for data over the network 150. The requests are chopped into subrequests and the subrequests are mixed together on the network 150. Each small rectangular block in FIG. 1 represents a subrequest and the pattern on each of the blocks correspond to the client process X, Y, or Z making the request. DataFlood receives the shuffled subrequests. Inside DataFlood, a component 110 effectively recombines the small subrequests into the longer original request before fetching the data from the physical storage 190. By fetching larger requests, mechanical accesses, such as positioning of the read/write head 195, are reduced. Though FIG. 1 only shows three client processes, DataFlood is capable of managing hundreds of concurrent request streams. The client processes X, Y, and Z may originate from any number of clients, e.g. a single client can create all three processes or three separate clients can each create a single process.

Pulling the individual client subrequests out of the mixture of subrequests that arrives at the server and recombining them into the original client requests is a daunting task. However, an excellent approximation of this operation can be achieved by extending one or more of the client subrequests along the logical path of the target file, that is, along the file path. This approximation works because the subrequests were created by chopping the original client request into many smaller but contiguous pieces, so extrapolating one subrequest approximates the original file request to a large degree. This approximate reconstruction of the original client request is performed by a component 110 of DataFlood.

Figure 2:
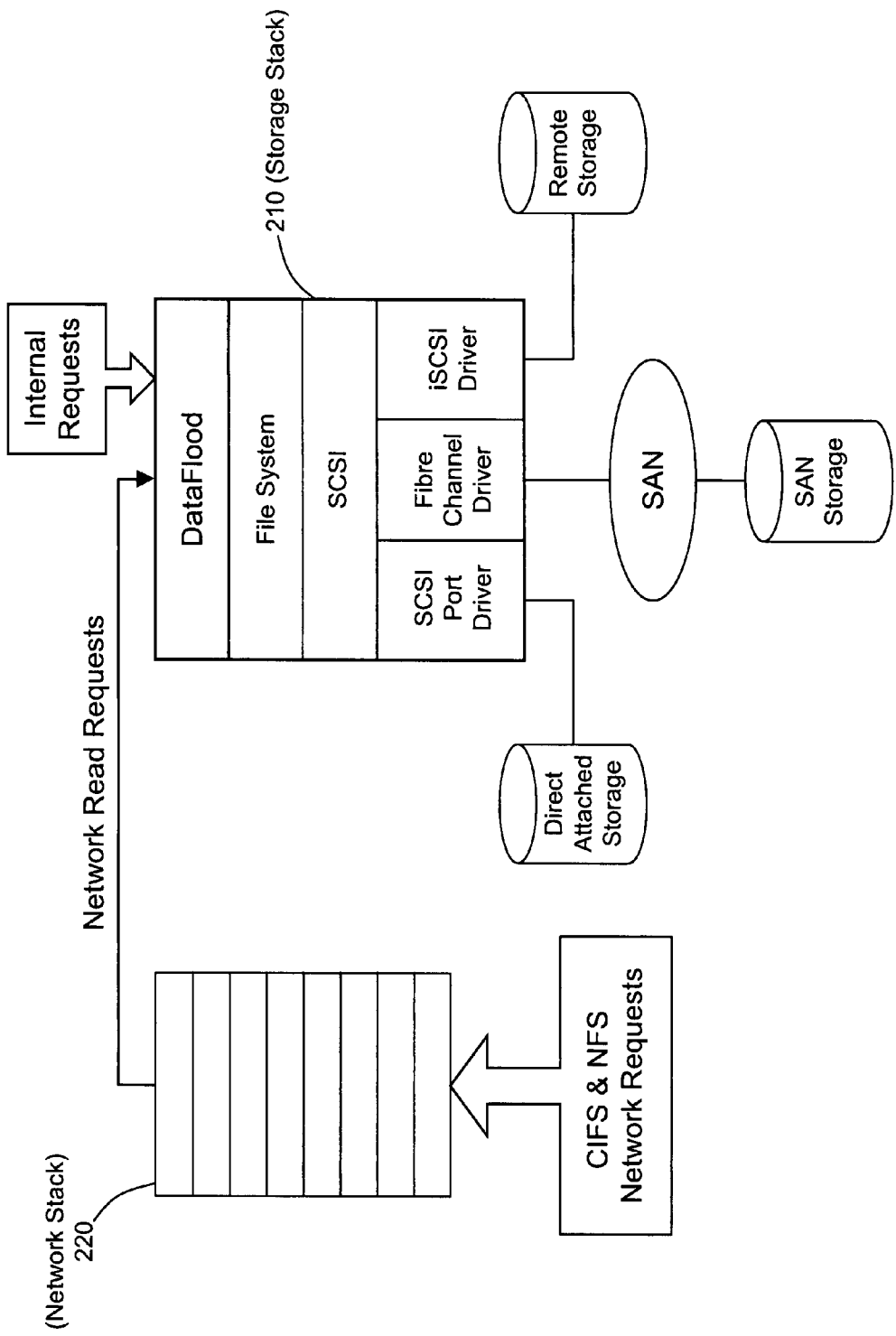
FIG. 2 shows an example of DataFlood in a computer file server system according to the present invention.

It is important to note that the extension of the subrequest is accomplished at the file level. DataFlood is located in the operating system on top of the file system, therefore it operates on file data rather than physical disk blocks. Because DataFlood extends subrequests along the file path it is not thwarted by segmenting that may occur lower at the physical disk level. For example, if a file is broken into physical chunks A, B, and C on the storage disks, where these chunks are non-contiguous on the physical disk and perhaps even spread across multiple physical disks, the single extended file request will automatically fetch these three separate physical chunks, while if the disk controller extends the first chunk along the physical surface, the result will not include the other two chunks. FIG. 2 shows the location of DataFlood at the top of the file system in an example computer file server system.

To increase the probability that the data being read ahead into the next DataFlood buffer is relevant to the client, DataFlood contains intelligence that senses the direction a client process is moving through a file and extends the request in that direction. In other words, an analysis of the direction that past subrequests are making through the file enables DataFlood to wisely choose the forward or the backward direction for the file request extension.

In combination with the file-level request extension, DataFlood also builds a double-buffered path for each file being requested through DataFlood. The combination of the file read ahead and the double-buffered path that defines DataFlood is represented in FIG. 1 by the dashed lines 100. A double-buffered path for client process X is represented by the pair of buffers AX and BX. Pairs of buffers AY-BY and AZ-BZ are also shown for client processes Y and Z, respectively. In one embodiment of DataFlood the two buffers used to double-buffer each file are dynamically assigned from a pool of free buffers as needed. In this embodiment, when a buffer has been exhausted it is released back to the pool of free buffers. As one of ordinary skill in the art could appreciate, other buffer schemes would still effectively operate the present invention, e.g. a fixed pair of buffers can be assigned to a file and the buffers alternated, or more than two buffers can be used for each file. DataFlood buffers are significantly larger than the typical request sent to the file system. In one embodiment, the buffers are two MBytes or approximately thirty four times larger than the typical 60 Kbyte subrequest, though any large-sized buffers could be used.

A double-buffered path boosts throughput of a server because the emptying of one buffer and the filling of the other buffer overlap in time. In other words, while DataFlood is satisfying a series of network subrequests immediately out of one DataFlood buffer, with no wait for any disk access, it is also filling a second DataFlood buffer from the storage system with the next data in the file. For example, in FIG. 1, buffers BZ, AY, and BX are satisfying network subrequests 130 immediately without any disk wait while the disk is filling buffer AZ 120. At the moment in time that FIG. 1 represents, buffers BY and AX have already been filled from the disk and are waiting to be used as soon as soon as the alternate buffers, BX and AY, have been emptied by network subrequests.

Because the emptying of one buffer by a client process and the filling of the alternate buffer by the storage system overlap in time, the client process waits only for the longer of the two transfers rather than for the sum of the amounts of time for the completion of the two transfers. It normally takes longer to fill a DataFlood buffer than to empty one so server throughput with DataFlood is normally limited by the speed at which a server storage system can fill the large DataFlood buffers. With or without DataFlood, remote clients normally see the storage system on the server as the bottleneck. With DataFlood in the server, this limit is the rate at which the large DataFlood buffers can be filled rather than the rate at which the random shorter requests arriving off the network can be filled and then delivered through a single-buffered path to the client. This difference can be as much as six fold.

The DataFlood method includes intelligence to prune the population of processes currently being serviced by DataFlood by dropping a subset of the processes that would not benefit from DataFlood. This intelligence analyzes past subrequests of a process to obtain a measure of randomness to determine whether or not future activity by this process is likely to be helped by DataFlood. The primary criteria for making this decision is the length of the original requests the client process is making and how contiguous these requests are. Processes making primarily short random requests are locked out of the DataFlood process population and their requests are thereafter passed around DataFlood to the file system for service. Processes that get locked out are periodically sampled again and may be let back into the DataFlood population if their activity profile changes. The pruning steps and the operation of passing unqualified subrequests through to the file system have virtually no overhead, therefore DataFlood has no noticeable effect on loads which may not benefit from its operations.

The DataFlood method, including directional file extensions, process pruning, and double-buffered paths with large buffers, applies to local application data requests as well as to remote client requests. As shown in FIG. 2, file requests may arrive at DataFlood from local applications within the server as well as from the network. Server applications that make relatively small requests to the file system can, therefore, be served well by DataFlood. These local applications may receive their requests from remote clients through sockets or other network protocols that do not directly access the server file system.

The location of DataFlood on top of the file system in the operating system makes DataFlood independent of the source of the file request. The request may come in over an Ethernet, Fibre Channel or any other network hardware and be using any network file system protocol, such as CIFS or NFS. The network stack 220 adapts all of these possibilities to file system requests that DataFlood can work with. Requests could also come from internal applications running in the server. This location of DataFlood also allows it to operate regardless of the eventual physical storage target of the request (local SCSI, SAN, or iSCSI). The file server code below DataFlood converts the file request from DataFlood to a disk request that works with any physical disk system attached to the server. FIG. 2 also shows that DataFlood is not restricted to a particular operating system. The DataFlood method will work in any operating system, including Windows, Linux, Solaris, or the proprietary code of a NAS box.

It is important to note that just as DataFlood works with local applications in a server, the DataFlood method can be loaded into and used to benefit any computer that is running applications that depend on the computer's local storage for data.

Though DataFlood works best for processes that are reading large files sequentially, surprisingly, DataFlood boosts throughput of a server even when a mixture of sequential and random activity exists. When only sequential data is being accessed on a disk, seeks do not normally occur because the spinning disk continues to bring the next data under the disk head as long as the sequential data is laid out sequentially on the disks. Random requests upset this situation by intermittently pulling the disk arm away from the sequential data so that consecutive requests for the sequential data now do require a seek to get back to the location of the sequential data. With DataFlood the sequential data on the disk quickly migrates to the DataFlood buffers, where it is again accessed without seeks. DataFlood typically boosts the server throughput by a factor of six when there is a mixture of random and sequential client read requests.

Requiring that clients or applications exhibit some sequential activity for DataFlood to be able to deliver its performance does not seriously limit the applicability of DataFlood because sequential activity is so common today. Today, file servers store a large amount media types of information, including medical images, satellite images, consumer digital camera images, video files, etc., which are sequential by nature. Note that the emerging 10 Gigabit Ethernet market also depends on this sequential nature for data accesses since servers pelted by short random requests will not benefit from a faster network, client time being dominated then by seek times.

Figure 3:
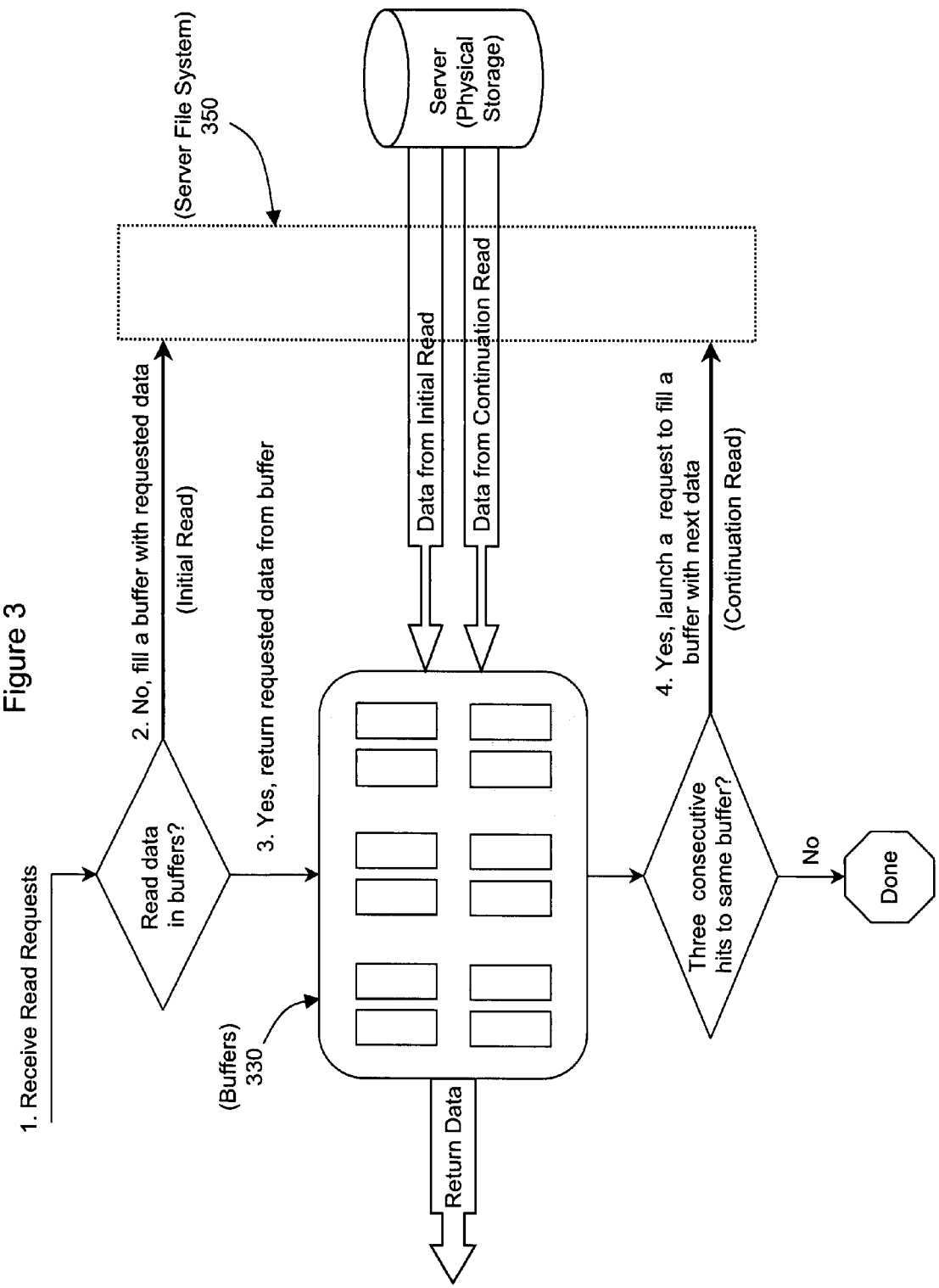
FIG. 3 shows a flow chart of an embodiment of the DataFlood method according to the present invention.

A preferred embodiment of the present method includes the following steps, which are also shown by FIG. 3 as a flow chart.

Step 1: Read request arrives at DataFlood. The request is either a subrequest from the network or a request directly from an application in the server Step 2: If the requested data is not in any of the DataFlood buffers, fill a free buffer with the requested data plus the data following this data in the file. This read is called an "initial" read.

Step 3: The requested data is now in a buffer; it was either there originally or it was brought into a free buffer in Step 2. Return the requested data.

Step 4: If the request history indicates that this is the third consecutive hit (request for data) to this buffer, launch a read request for the "next" buffer's worth of file data to a free buffer and assign this buffer to the file, where "next" may be forward or backward depending on the observed motion of the process through the file. This read from the storage is called a "continuation read."

While a "third consecutive hit" is used in Step 4 and in FIG. 3, DataFlood can be tuned for certain loads to work better if the continuation read is triggered by two, four, or any number of consecutive hits to the current buffer. A good choice of the number of consecutive hits would correctly indicate that the requesting process is accessing data in the current buffer and will probably make use of a next buffer if it is filled. Note that the continuation read in Step 4 that fills a buffer normally occurs at the same time that other subrequests from the client process are being serviced immediately from an already-filled buffer without making any disk access.

An Exemplary Windows 2003 Server Implementation of DataFlood

Below is a description of an exemplary Windows 2003 Server implemented with an embodiment of DataFlood. DataFlood is loaded into Windows as a "filter" using the standard, Microsoft documented Installable File System (IFS) interface. This load procedure runs during bootup and leaves DataFlood in the driver stack just above the file systems, as shown in FIG. 2. This position allows DataFlood to operate at the file level rather than at the disk level and insulates DataFlood from the type of network used to deliver the request and the type of storage attached to the server. At this location DataFlood receives all requests sent to the file system before the file system sees them and may either satisfy the request from its own buffers or make its own request to the file system for the requested data plus enough data to fill a DataFlood buffer.

During bootup DataFlood makes system calls to MmAllocatePagesForMdl( ) to allocate the memory from the system that it will use for the buffers. The installation process for DataFlood creates an area in the Windows registry for DataFlood that holds the amount of memory DataFlood may take from the system for its buffers. During bootup this value is read from the registry and used to determine the amount of memory to request from the system. Typically, 800 MBytes is requested for use by DataFlood. Note that while FIG. 3 shows only 12 buffers in the buffers block 330, if DataFlood were using 800 MBytes and the DataFlood buffers were 2 MBytes each, buffer block 330 would contain 400 buffers.

Figure 4:
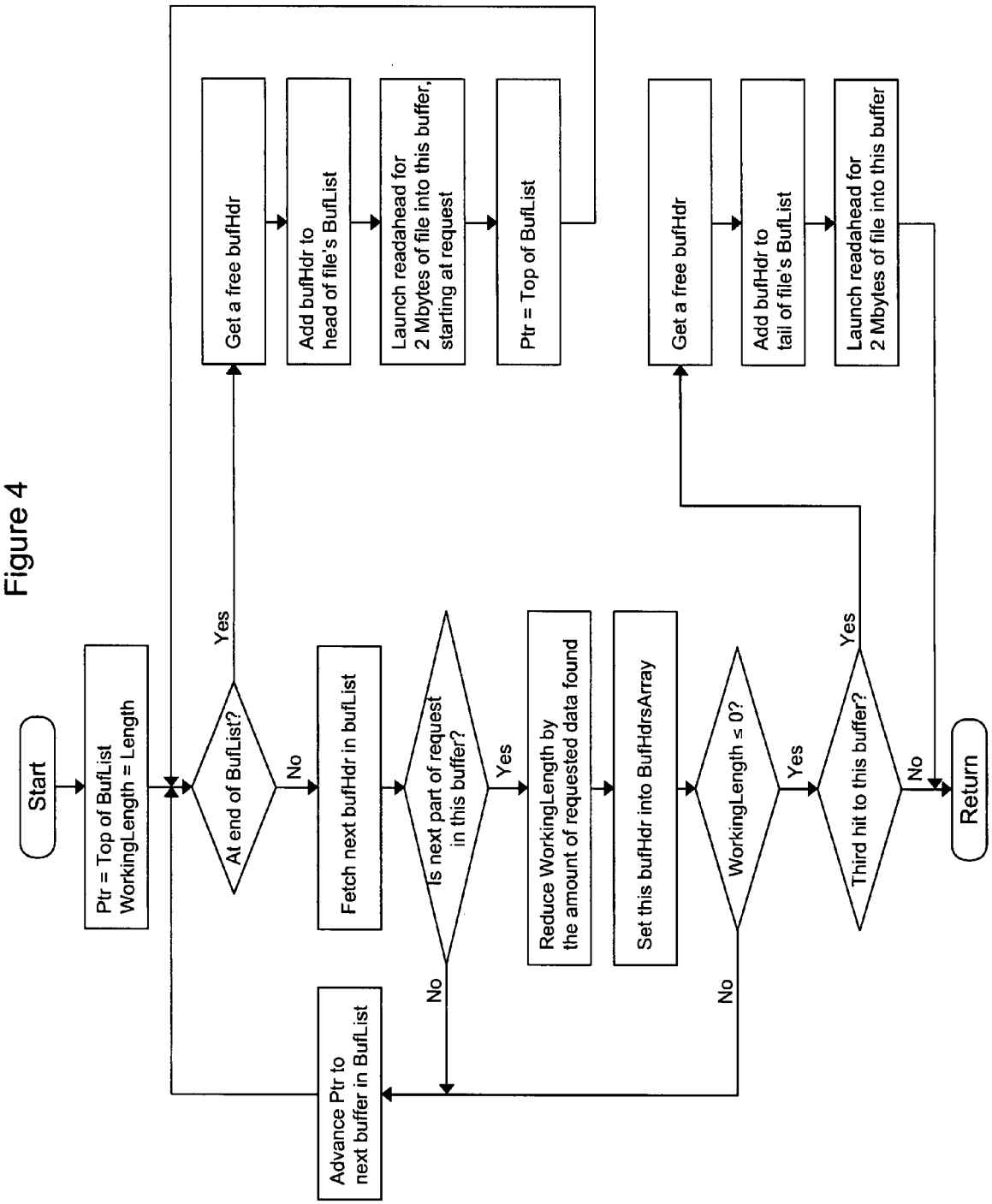
FIG. 4 shows a flow chart of a FindRequest routine of an embodiment of the present invention directed to boosting throughput of a Windows server.

Read requests that are sent to the Windows file system may be of three types, therefore three separate read service routines exist in the Windows version of DataFlood. The difference between these read service routines is not material to the DataFlood implementation. Each style of Windows read presents its request parameters differently and expects data and status to be returned in a different way. Each of the DataFlood read service routines works within the format of the read it services, but they all call a common FindRequest routine within DataFlood, which contains the important DataFlood search and fill operations. FIG. 4 is a flow chart of the FindRequest routine.

FindRequest is a DataFlood process called by all read service routines that searches the DataFlood buffers for the requested data and makes the necessary calls to the file system to bring new data into the DataFlood buffers. FindRequest normally returns with pointers to the requested data. If the requested data could not be obtained, a message is returned and the request is sent around DataFlood directly to the file system.

The buffers themselves contain only data. Each buffer, however, has a bufhdr structure associated with it that describes the source of the data residing in the buffer and contains statistics about usage of the buffer that help Data- Flood prune the list of used buffers, whereby it returns buffers no longer judged useful to a free list of buffers. DataFlood does not implement a cache; once data in a buffer has been read, DataFlood tries to free the buffer as quickly as possible. Caches, on the other hand, hold onto data in anticipation of repeated hits.

FindRequest is entered from the read routines with the following parameters:

FileControlBlock—a structure containing various parameters related to the file being accessed, including a BufList head, which points to a linked list of buffers holding data for this file.

BufHdrsArray—an array with empty slots for bufhdrs. Filling this array is the way FindRequest returns pointers to the requested data.

Length—a parameter indicating the number of bytes being requested.

Offset—a parameter indicating the offset from the beginning of the file to the beginning of the requested data.

Variables used locally within the FindRequest routine include:

Ptr—a pointer that works down through the file's BufList

WorkingLength—a variable, initialized at the beginning of the call with Length, passed in and reduced by the amount of data found in the buffers as FindRequest locates the requested data.

As one of ordinary skill in the art will appreciate, various changes, substitutions, and alterations could be made or otherwise implemented without departing from the principles of the present invention, e.g. the Windows server could be replaced with another computer file server and read requests could be replaced by write requests. Accordingly, the scope of the invention should be determined by the following claims and their legal equivalents.

What is claimed is:

1. A method for increasing the throughput between a computer file server and its network clients consisting of inserting a layer of software into the server's operating system at a location above the file system where said software can intercept subrequests to said file system from network clients and by extending said subrequests cause additional data further along in the requested file to be read from the server's storage system, wherein said added layer of software performs the following functions:
   a) extends the length of subrequests arriving at the server if said subrequests are not yet in buffers allocated to said software layer,
   b) submits said extended subrequests to the file system of the server's operating system, and
   c) double-buffers data on the return path from the server's storage system to said network clients with two buffers each large enough to hold the entire extended subrequest data returned from the storage system.

2. The method as set forth in claim 1 wherein said extension of the length of the said subrequests is in a forward or a backward direction depending on a direction analysis of said subrequests, so that network clients benefit from the invention whether they are reading a file forward or backward.

3. The method as set forth in claim 1 wherein said buffers are dynamically allocated from a buffer pool as needed and are freed back to said buffer pool soon after their data has been read.

4. The method as set forth in claim 1 wherein client processes that generate requests that are not long enough to benefit from the extra data returned by said extended subrequests are excluded from the population of processes being serviced by said software layer until a later analysis by said software layer determines that said excluded processes have begun to generate requests that are long enough to benefit from processing by said software layer.

5. A method for increasing the throughput between a computer's storage system and its local processes consisting of inserting a layer of software into the computer's operating system at a location above the file system where said software can intercept requests to said file system from local processes and by extending said requests cause additional data further along in the requested file to be read from the computer's storage system, wherein said added layer of software performs the following functions:
   a) extends the length of requests arriving at the file system if said subrequests are not yet in buffers allocated to said software layer,
   b) submits said extended requests to the file system of the computer's operating system, and
   c) double-buffers data on the return path from the computer's storage system to said local processes with two buffers each large enough to hold the entire extended request data returned from the storage system.

6. The method as set forth in claim 5 wherein said extension of the length of the said requests is in a forward or a backward direction depending on a direction analysis of said requests, so that local processes benefit from the invention whether they are reading a file forward or backward.

7. The method as set forth in claim 5 wherein said buffers are dynamically allocated from a buffer pool as needed and are freed back to said buffer pool soon after their data has been read.

8. The method as set forth in claim 5 wherein local processes that generate requests that are not long enough to benefit from the extra data returned by the extended requests are excluded from the population of processes that are serviced by said software layer until a later analysis by said software layer determines that said excluded processes have begun to generate requests that are long enough to benefit from processing by said software layer.

* * * * *